May 4, 1948.  V. VAN BRUNT  2,440,989
RELEASABLE BOBBER STOP FOR FISHLINES
Filed Dec. 27, 1945
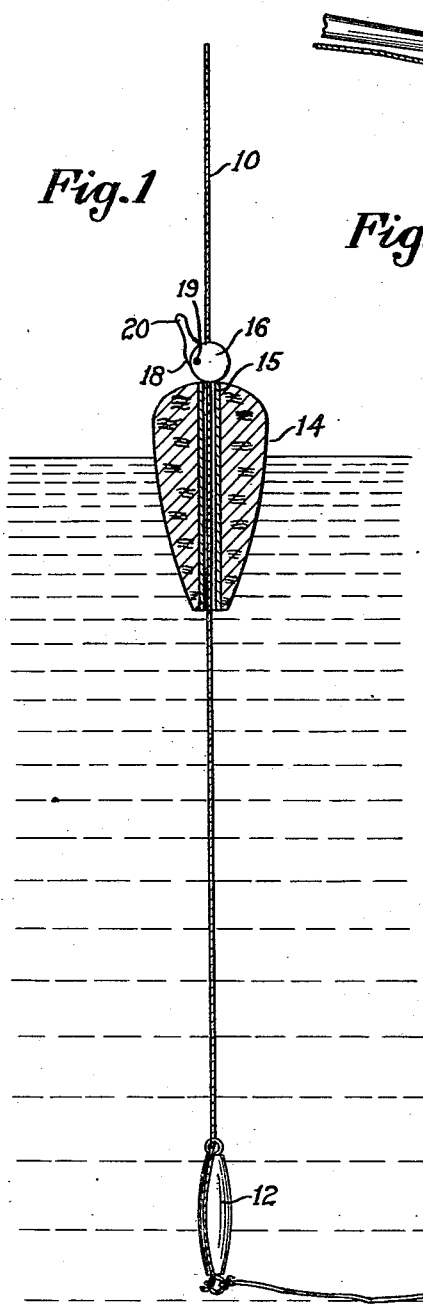
Fig. 1
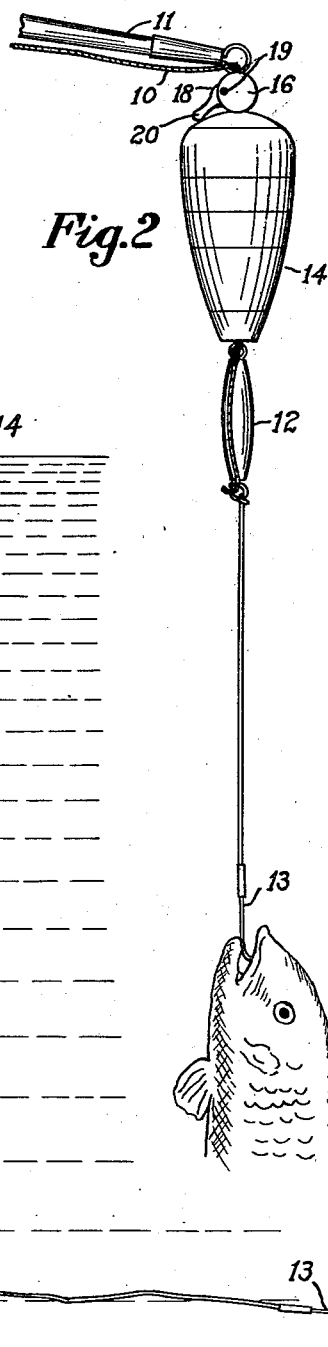
Fig. 2
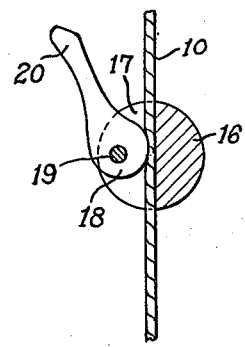
Fig. 5
Fig. 3
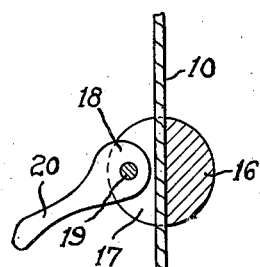
Fig. 4
Inventor
Vernon Van Brunt
By Frease and Bishop
Attorneys Patented May 4, 1948

2,440,989

UNITED STATES PATENT OFFICE 2,440,989

RELEASABLE BOBBER STOP FOR FISHLINES

Vernon Van Brunt, Ecorse, Mich.

Application December 27, 1945, Serial No. 637,398

2 Claims. (Cl. 43—49)

The invention relates to bobbers or floats for fishlines, and more particularly to a bobber appliance especially adapted for use in casting.

When a fisherman is casting it is frequently desirable to have a relatively long stretch of line between the bobber or float on the surface of the water and the hook and sinker, so as to position the latter at any required depth below the surface.

It is difficult to cast with a long stretch of line beyond the bobber or float as frequently the hook or sinker becomes snarled or snagged in the line above the bobber, or becomes entangled in surrounding objects.

Obviously the bobber or float should be positioned closely adjacent to the sinker or hook when the line is cast out, so as to avoid the above mentioned difficulty in casting. However, if the float is attached to the line at this point the hooks will be located at or near the surface when the float is positioned on the surface of the water.

In order to overcome the above difficulties and objections, attempts have been made to provide a casting float having means therein which permit the float to be positioned at the sinker or hook for casting, whereby the float, with the sinker and hooks at the end of the line will sink to the bottom, after which the float will rise along the line to the surface of the water.

This leaves the sinker and hook resting upon the bottom and in order to position them at any point above the bottom it is necessary for the fisherman to reel in part of the line which not only results in guesswork as to the depth at which the hooks are positioned below the surface but obviously draws the float closer to the boat or other point at which the fisherman is located, thus partially destroying the effect of casting the line a distance from the boat.

It is also known that it has been more or less common practice to provide floats with gripping means so that the float may be secured at a definite point on the line remote from the hooks and sinker, the gripping means being releasable upon reeling in the line to the point where the float reaches the end of the fishing rod.

Such devices however are subject to the above mentioned difficulties and disadvantages in casting, allowing the line to be subject to a whipping action during the casting operation and frequently resulting in entanglement of the hooks and sinkers with the line or with surrounding objects.

The object of the present invention is to provide a bobber or float associated with an automatically releasable stop which permits the float to be positioned at the hook or sinker for casting and also permits the bobber or float to rise upon the line to any pre-determined distance above the hooks and sinker so as to position the hooks at the desired depth below the surface, the releasable stop being automatically released by contact with the tip of the fishing rod as the line is reeled in.

Another object is to provide a device of this character comprising a stop for the bobber in the form of an automatically releasable cam which may be positioned at any desired point upon the line relative to the hooks and sinker, the bobber or float having an axial tube or passage therethrough, through which the line may run freely.

The above objects, together with others which will be apparent from the drawing and following description, or which may be later referred to, may be attained by constructing the improved releasable bobber stop in the manner hereinafter described in detail and illustrated in the accompanying drawing, in which:

Figure 1 is a vertical sectional elevation showing a fish line equipped with the improved bobber stop, the bobber being positioned on the surface of the water with the hook and sinker in position at a distance below the surface;

Fig. 2 an elevation showing the fish line reeled in to the point where the automatic stop has been released by contact with the tip of the fishing rod permitting the bobber or float to slide downward upon the line into contact with the sinker;

Fig. 3 an enlarged sectional view through the automatically releasable stop showing the same in locked position upon the fish line;

Fig. 4 a similar view showing the cam of the stop in released or unlocked position; and Fig. 5 an edge elevation of the stop in the position shown in Fig. 3.

A length of ordinary fish line is indicated at 10, which may be threaded through the eye of a fishing rod 11 and has at its free end a sinker 12 and hook 13, as in usual and well known practice.

The bobber or float is indicated generally at 14 and may be of any usual shape and design, formed of cork or similar buoyant material, and for the purpose of the invention is provided with an axial passage or tube 15 extending entirely through the center and of such diameter that the fish line will freely run therethrough.

The automatically releasable bobber or float stop to which the invention pertains may be in the form of a clamp adapted to be located at any desired point upon the line and comprising the casing 16 which may be formed of non-corrosive metal such as aluminum or brass, or of plastic or other suitable material which will not be effected by moisture.

This casing may be of any desired or convenient shape and is provided through one side with a slot 17 of sufficient width to permit the fish line to freely run therethrough.

An eccentric cam 18 is located within the slot 17 and pivoted within the casing as by the stud or pin 19. The cam 18 has a lever handle 20 rigidly formed thereon and extending outward from the slot 17 so that it may be easily manipulated by hand, or automatically by contact with the tip of the fishing rod as will be later explained.

When the eccentric cam is moved to the position shown in Fig. 3, with the lever handle 20 in raised position, it will be seen that the fish line 10 is tightly pinched between the high point of the cam and the back wall of the slot 17 so that the casing 16 of the stop is locked at this point upon the fish line.

However when the cam is moved to the position shown in Fig. 4, with the lever handle 20 in unlocked position, the lower point upon the eccentric will be spaced from the fish line 10 so that the same may freely run through the slot 17 of the casing 16.

When it is desired to use the device for casting the stop is locked upon the fish line at the desired distance from the sinker 12 by operating the eccentric cam 18 in the manner above described and as shown in Fig. 3.

The float 14 will slide down upon the line into contact with the sinker 12 so that when the line is cast out, when the bobber or float hits the water it will lay on the surface and the line will run through the tube 15 in the bobber until the stop 16 comes in contact with the top of the bobber, positioning the sinker and hook at the desired distance below the surface of the water as shown in Fig. 1.

When a fish is hooked upon the hook 13 the fish line 10 is reeled in in usual manner and as the handle lever 20 of the stop comes in contact with the tip of the fishing pole 11, it will be thrown down to the unlocked position shown in Figs. 2 and 4, permitting the line to be reeled in to any desired extent as shown in Fig. 2.

When the fisherman is ready to cast the line out again he will again lock the stop 16 upon the line at the desired point and cast in the manner above described.

From the above it will be seen that a releasable stop is provided for the bobber or float which permits the float to be positioned at the sinker or hook when casting so as to overcome the difficulties and objections above pointed out, while when the float strikes the water the hook will be positioned at the desired depth below the surface.

It will also be obvious that the stop being automatically releasable by contact with the tip of the fishing pole permits the line to run freely therethrough when the line is reeled in so that the stop does not in any manner interfere with the reeling in of the line when a fish is hooked.

I claim:

1. In combination with a fishing bobber having a bore therethrough, a fish line freely slidable through said bore, and a releasable stop through which the line is freely slidable, said stop being separate from the bobber and comprising an eccentric cam for manually clamping the stop at any point upon the line and a tripping finger for automatically unclamping the stop from the line when the line is reeled in to a predetermined point.

2. In combination with a fishing bobber having a tube therethrough, a fish line freely slidable through said tube, a fishing rod upon which the line is threaded, and a releasable stop through which the line is freely slidable, said stop being separate from the bobber and comprising a casing having a slot in one side to receive the fish line, an eccentric cam pivoted in the slot for clamping the fish line therein and a tripping finger upon the cam for contact with the tip of the rod for automatically unclamping the cam.

VERNON VAN BRUNT.

REFERENCES CITED

The following references are of record in the file of this patent:

UNITED STATES PATENTS

| Number | Name | Date |
|---|---|---|
| 250,848 | Smith | Dec. 13, 1881 |
| 786,597 | Picken | Apr. 4, 1905 |
| 1,385,837 | Kistner | July 26, 1921 |
| 1,410,162 | Cadwell | Mar. 21, 1922 |

FOREIGN PATENTS

| Number | Country | Date |
|---|---|---|
| 16,918 | Great Britain | 1907 |